US012438926B2

(12) United States Patent
Hong

(10) Patent No.: US 12,438,926 B2
(45) Date of Patent: Oct. 7, 2025

(54) METHOD AND APPARATUS FOR SELECTING NETWORK SLICE ADMISSION CONTROL FUNCTION

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 18/292,560

(22) PCT Filed: Jul. 27, 2021

(86) PCT No.: PCT/CN2021/108772
§ 371 (c)(1),
(2) Date: Jan. 26, 2024

(87) PCT Pub. No.: WO2023/004605
PCT Pub. Date: Feb. 2, 2023

(65) Prior Publication Data
US 2024/0348667 A1 Oct. 17, 2024

(51) Int. Cl.
*G06F 15/16* (2006.01)
*H04L 41/0894* (2022.01)
(Continued)

(52) U.S. Cl.
CPC ...... *H04L 65/1069* (2013.01); *H04L 41/0894* (2022.05); *H04L 43/0817* (2013.01); *H04W 76/18* (2018.02)

(58) Field of Classification Search
CPC ............. H04L 65/1069; H04L 41/0894; H04L 43/0817; H04W 76/18
See application file for complete search history.

(56) References Cited

U.S. PATENT DOCUMENTS

2022/0330139 A1* 10/2022 Lee ........................ H04W 60/00

FOREIGN PATENT DOCUMENTS

WO WO 2021/063744 A1 4/2021
WO WO 2021/132505 A1 7/2021

OTHER PUBLICATIONS

International Search Report of International Application No. PCT/CN2021/108772, dated Mar. 28, 2022, 5 pages.
(Continued)

*Primary Examiner* — Joseph R Maniwang
(74) *Attorney, Agent, or Firm* — Finnegan, Henderson, Farabow, Garrett & Dunner, L.L.P.

(57) ABSTRACT

A method for Network Slice Admission Control Function (NSACF) selection is performed by a Session Management Function (SMF). The method includes: receiving, via an Access and Mobility Management Function (AMF), a Protocol Data Unit (PDU) session establishment request from User Equipment (UE); and in response to receipt of the PDU session establishment request, selecting a first NSACF for a network slice based on a service capability of at least one NSACF; wherein the service capability comprises at least one of: a first service capability that supports monitoring and controlling a number of registered UEs for the network slice, or a second service capability that supports monitoring and controlling a number of established PDU sessions for the network slice.

18 Claims, 8 Drawing Sheets

(51) Int. Cl.
　　　*H04L 43/0817*　　(2022.01)
　　　*H04L 65/1069*　　(2022.01)
　　　*H04W 76/18*　　　(2018.01)

(56) References Cited

OTHER PUBLICATIONS

3GPP TS 23.501 V17.1.0 (Jun. 2021); Technical Specification Group Services and System Aspects; System architecture for the 5G System (5GS); Stage 2 (Release 17).
3GPP TS 23.501 V17.1.1 (Jun. 2021); Technical Specification Group Services and System Aspects; System architecture for the 5G System (5GS); Stage 2 (Release 17).
3GPP TR 23.700-40 V17.0.0 (Mar. 2021); Technical Specification Group Services and System Aspects; Study on enhancement of network slicing; Phase 2 (Release 17).
3GPP TS 23.501 V18.4.0 (Dec. 2023); Technical Specification Group Services and System Aspects; System architecture for the 5G System (5GS); Stage 2 (Release 18).
3GPP TS 23.502 V18.4.0 (Dec. 2023); Technical Specification Group Services and System Aspects; Procedures for the 5G System (5GS); Stage 2 (Release 18).
3GPP TS 23.503 V18.4.0 (Dec. 2023); Technical Specification Group Services and System Aspects; Policy and charging control framework for the 5G System (5GS); Stage 2 (Release 18).
"TS23.502 K1#2 Network Slice Admission Control Function (NSACF) services and procedures", CATT, 3GPP TSG-SA WG2 Meeting #145E e-meeting, S2-2104422, Elbonia, May 17-28, 2021, 5 pages.
"Architecture enhancement of NSACF to support distributed NSACF", Huawei, HiSilicon, China Unicom, China Telecom, 3GPP TSG-WG SA2 Meeting #144E e-meetimg, S2-2102570, Elbonia, Apr. 12-16, 2021, 3 pages.
"Pseudo-CR on SMF as service consumer", Huawei, ZTE, 3GPP TSG WG4 Meeting #104-e, C4-213435, E-Meeting, May 19-28, 2021, 2 pages.
"NumOfPDUsPerSlice—Service and Procedure description", ZTE, 3GPP TSG-CT WG4 Meeting #104-e, C4-213453, E-Meeting, May 19-28, 2021, 8 pages.
The First Office Action issued by the State Intellectual Property Office of People's Republic of China on Jul. 16, 2025, in corresponding Application No. CN 202180002132.6, 10 pages.

\* cited by examiner

Perform NSACF selection for a network slice based on a service capability of at least one NSACF ── S101

FIG. 1

Perform NSACF selection for a network slice based on a service capability of at least one NSACF S2011, select a NSACF having the first service capability and the second service capability for the network slice

Perform NSACF selection for a network slice based on a service capability of at least one NSACF S3011, select a NSACF having the first service capability and the second service capability for the network slice S3012, when a plurality of NSACFs have the first service capability and the second service capability, select a NSACF with a high priority from the plurality of NSACFs

Perform NSACF selection for a network slice based on a service capability of at least one NSACF S4011, if the network slice supports monitoring and controlling of the number of registered UEs, select, for the network slice, a NSACF that monitors and controls the number of registered UEs for the network slice and has the second service capability

METHOD AND APPARATUS FOR SELECTING NETWORK SLICE ADMISSION CONTROL FUNCTION

CROSS REFERENCE TO RELATED APPLICATION

The present application is a U.S. National Stage of International Application No. PCT/CN2021/108772, filed on Jul. 27, 2021, the content of which is incorporated herein by reference in its entirety.

TECHNICAL FIELD

The present disclosure relates to the field of mobile communication technology, and in particular to a method and apparatus for Network Slice Admission Control Function (NSACF) selection.

BACKGROUND

Network slicing technology allows operators to provide various customized networks, for example, providing networks with different requirements on functionality, or having differences in performance requirements (e.g., requirements like latency, mobility, availability, reliability and data rate bandwidth and so on), or network functionality is only available to specific users, such as multi-projection system users, public safety users, corporate customers, roamers, or mobile virtual network operator hosting.

Currently, Network Function (NF) usually utilizes Network Repository Function (NRF) to perform discovery and selection. However, how to select an appropriate NSACF to make it more conducive to function implementation of monitoring and controlling and counting the number of UEs for a network slice and functionality implementation of monitoring and controlling and counting the number of sessions for a slice (such as less signaling interaction, reducing multiple function switching caused by UE mobility, optimizing function implementation) is a key issue that need to be solved urgently.

SUMMARY

A first aspect of the present disclosure provides a method for NSACF selection, wherein the method is performed by a Session Management Function (SMF), and the method includes: performing NSACF selection for a network slice based on a service capability of at least one NSACF; wherein the service capability includes at least one of: a first service capability that supports monitoring and controlling a number of registered User Equipments (UEs) for the network slice, and a second service capability that supports monitoring and controlling a number of established Protocol Data Unit (PDU) sessions for the network slice.

A second aspect of the present disclosure provides an apparatus for NSACF selection, wherein the apparatus is applied in a Session Management Function (SMF), and the apparatus includes: a processing module configured to perform NSACF selection for a network slice based on a service capability of at least one NSACF; wherein the service capability includes at least one of: a first service capability that supports monitoring and controlling a number of registered User Equipments (UEs) for the network slice, and a second service capability that supports monitoring and controlling a number of established Protocol Data Unit (PDU) sessions for the network slice.

A third aspect of the present disclosure provides a communication device including: a transceiver; a memory; and a processor connected to the transceiver and the memory and configured to control sending and receiving of a wireless signal of the transceiver by executing computer-executable instructions in the memory and be capable of implementing the method for NSACF selection according to the first aspect.

A fourth aspect of the present disclosure provides a non-transitory computer storage medium, wherein the computer storage medium stores computer-executable instructions; when the computer-executable instructions are executed by a processor, the method for NSACF selection according to the first aspect can be implemented.

BRIEF DESCRIPTION OF THE DRAWINGS

The above and/or additional aspects and advantages of the present disclosure will become apparent and readily understood from the following description of the embodiments in conjunction with the accompanying drawings, in which:

FIG. 1 is a schematic flowchart of a method for NSACF selection according to an embodiment of the present disclosure;

FIG. 2 is a schematic flowchart of a method for NSACF selection according to an embodiment of the present disclosure;

FIG. 3 is a schematic flowchart of a method for NSACF selection according to an embodiment of the present disclosure;

FIG. 4 is a schematic flowchart of a method for NSACF selection according to an embodiment of the present disclosure;

DETAILED DESCRIPTION

Figure 5:
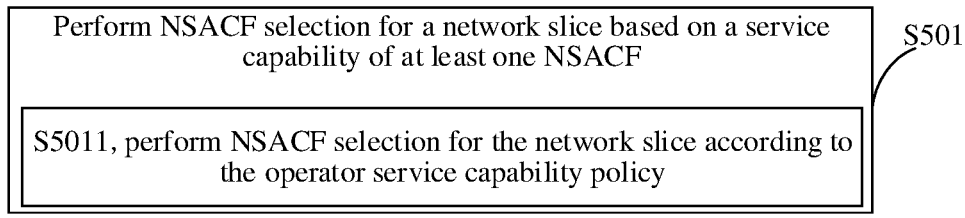
FIG. 5 is a schematic flowchart of a method for NSACF selection according to an embodiment of the present disclosure.

Embodiments of the present disclosure are described in detail below, examples of which are illustrated in the accompanying drawings, where the same or similar reference numerals throughout represent the same or similar elements or elements having the same or similar functions. The embodiments described below with reference to the accompanying drawings are exemplary and intended to explain the present disclosure and are not to be construed as limitations of the present disclosure.

Network slicing technology allows operators to offer various customized networks, for example, there are differences between function requirements (e.g., priority, charging, policy control, security, and mobility), there are differences in performance requirements (e.g., latency, mobility, availability, reliability and data speeds), or services may be available only to specific users (e.g., multi-projection system users, public safety users, corporate customers, roamers, or mobile virtual network operator hosting).

A network slice can provide complete network functions, including an radio access network function, a core network function and an IP Multimedia Subsystem (IMS) function. A network may support one or more network slices. Differences exist between network slices due to differences in supported network functions and performances. A network slice instance means an instantiation of a network slice, i.e., a set of deployed network functions that delivers an intended network slice service according to a network slice template.

The features and network function optimization supported by each network slice may be different. Each network slice may have different Single-Network Slice Selection Assistance Information (S-NSSAI) to identify a different slice or service type, which has a different slice/service type.

Operators may deploy multiple network slices delivering the same functions but for different groups of UEs or different categories of UEs, e.g. as they deliver a different service property or they provide network dedicated to a user, in which case slices may be identified by different S-NSSAIs with the same type.

The selection of a set of network slice instances for a UE is triggered by the first Access and Mobility Management Function (AMF) in a registration procedure normally by interacting with Network Slice Selection Function (NSSF). Slice selection may result in AMF reselection. A PDU Session belongs to one and only one specific network slice instance per PLMN. Different network slice instances do not share a same PDU Session, although different network slice instances may have slice-specific PDU sessions using the same DNN. During a handover procedure, the source AMF selects a target AMF by interacting with NF Repository Function (NRF).

A Network Slice Type (NEST) is applied to a network slice. Multiple network slice instances may be deployed for a network slice. Generic Network Slice Template (GST) defines attributes supported by a network slice, for example: 1) number of terminals; this attribute describes the maximum number of terminals that can use the network slice simultaneously; 2) number of connections; this attribute describes the maximum number of concurrent sessions supported by the network slice. These are important input to determine the size of the network slice and provide sufficient resources for the network slice.

A network slice can support a limited number of User Equipments (UEs) using the network slice simultaneously and a limited number of concurrent sessions. In order to support controlling of the number of terminals and Protocol Data Unit (PDU) sessions for the network slice, Network Slice Admission Control Function (NSACF) is introduced in the 5G communication system. For network slices subject to Network Slice Admission Control (NSAC), NSACF monitors and controls the number of registered UEs per network slice and the number of PDU sessions per network slice.

Multiple NSACFs may be deployed in a network, or multiple NSACF instances may be deployed. Operator networks may include the following different NSACF deployment solutions. Multiple NSACFs are deployed for one network slice. Or, multiple NSACFs serving multiple network slices of a large network to facilitate scalability. Single or multiple NSACFs are dedicated to a specific network slice to provide customized services, such as isolation of slices. In addition, when multiple network slice instances are deployed in a network slice, the above solutions are also possible.

Network Function (NF) usually uses Network Repository Function (NRF) to perform NSACF discovery and selection. A discovery network function may use NRF or an operator policy (such as local configuration) to perform NSACF discovery and selection. This scheme applies to discovery and selection of NSACF function(s) or NSACF instance(s). But how to select an appropriate NSACF more accurately and with less signaling, which is more conducive to function implementation of monitoring and controlling and counting of the number of UEs and function implementation of monitoring and controlling and counting of the number of slice sessions for a network slice (such as less signaling interaction or function interaction, supporting and optimizing function implementation) is a key issue that need to be solved.

Since not all NSACFs support the same capabilities. For example, some NSACFs may support admission control only with respect to the maximum number of UEs, or some NSACFs may only support admission control with respect to the maximum number of PDU sessions, or some NSACFs may support both admission control with respect to maximum number of UEs and admission control with respect to the maximum number of PDU sessions.

However, in the current NSACF selection and discovery mechanism, the different capabilities of NSACFs and different NSACF deployment options are not taken into consideration.

Thus, the purpose of the present disclosure is to: select an appropriate NSACF taking into account a factor such as not all NSACFs supporting the same capabilities; select an appropriate NSACF with less signaling, such as less transmission of network slice status notifications and reports or NF device relocation, etc.; select an appropriate NSACF with higher accuracy.

The present disclosure proposes a method and apparatus for NSACF selection. The SMF selects a NSACF for a network slice based on a service capability of at least one NSACF, where the service capability includes a first service capability that supports monitoring and controlling the number of registered User Equipments (UEs) for the network slice and/or a second service capability that supports monitoring and controlling the number of established Protocol Data Unit (PDU) sessions for the network slice, thereby enabling the selection of an appropriate NSACF more accurately and with less signaling.

The method and apparatus for NSACF selection provided by the present disclosure will be introduced in detail below with reference to the accompanying drawings.

FIG. 1 shows a schematic flowchart of a method for NSACF selection according to an embodiment of the present disclosure. As shown in FIG. 1, this method may be performed by a Session Management Function (SMF) and includes the following steps.

In S101, NSACF selection is performed for a network based on a service capability of at least one NSACF.

The service capability includes at least one of the following: a first service capability that supports monitoring and controlling the number of registered User Equipments (UEs) for the network slice, and a second service capability that supports monitoring and controlling the number of established Protocol Data Unit (PDU) sessions for the network slice.

A NSACF may have a variety of different service capabilities. For example, a NSACF may have a service capability that only supports monitoring and controlling the number of registered UEs for a network slice; or, a NSACF may have a service capability that only supports monitoring and controlling the number of established PDU sessions for a network slice; or, a NSACF may have a service capability that supports both monitoring and controlling the number of registered UEs for a network slice and monitoring and controlling the number of established PDU sessions for the network slice. If a NSACF is directly selected without considering the service capability of the NSACF, a NSACF that does not meet requirement(s) may be selected. For example, in a case of PDU session establishment, if the SMF directly selects a NSACF for a network slice without considering the service capability of the NSACF, it is possible that the SMF selects a NSACF that does not have the service capability to support monitoring and controlling the number of established PDU sessions for the network slice, that is, a NSACF that does not meet the requirement(s) may be selected. In this case, the SMF may be required to re-select a NSACF, which will lead to a complicated NSACF selection procedure and result in more signaling transmissions.

In this embodiment, the SMF can select a NSACF for the network slice based on the service capability of at least one NSACF, and thus the SMF performs NSACF selection by taking the service capability that NSACF(s) has into consideration.

It should be noted that when the deployed NSACF has multiple NSACF instances, the method for NSACF selection in this embodiment is also applicable, that is, NSACF instance selection may be performed based on the service capability of the NSACF instances. The specific details will not be repeated here.

According to the method for NSACF selection in this embodiment, the SMF performs NSACF selection for a network slice based on the service capability of at least one NSACF, where the service capability includes a first service capability that supports monitoring and controlling the number of registered User Equipments (UEs) for the network slice and/or a second service capability that supports monitoring and controlling the number of established Protocol Data Unit (PDU) sessions, thereby enabling the selection of an appropriate NSACF more accurately and with less signaling.

FIG. 2 shows a schematic flowchart of a method for NSACF selection according to an embodiment of the present disclosure. The method may be executed by SMF. As shown in FIG. 2, the method may include the following steps.

In S201, NSACF selection is performed for a network slice based on a service capability of at least one NSACF.

For details of S201, reference may be made to the description of step S101 in FIG. 1, which will not be described again here.

In this embodiment, the above step S201 may include the following steps.

In S2011, a NSACF having the first service capability and the second service capability is selected for the network slice.

In this embodiment, for the network slice, the SMF preferentially selects a NSACF that has the service capabilities that support both monitoring and controlling the number of registered UEs for the network slice and monitoring and controlling the number of established PDU sessions for the network slice.

In this embodiment, the NSACF that the SMF preferentially selects for the network slice supports the service capabilities of monitoring and controlling the number of registered UEs for the network slice and monitoring and controlling the number of established PDU sessions for the network slice. The selected NSACF can both meet the need to monitor and control the number of registered UEs for the network slice and the need to monitor and control the number of established PDU sessions for the network slice, thereby avoiding a complicated NSACF selection procedure and reducing signaling transmission.

According to the method for NSACF selection in this embodiment, the SMF preferentially selects a NSACF having service capabilities that support both monitoring and controlling the number of registered UEs for the network slice and monitoring and controlling the number of established PDU sessions for the network slice, thereby avoiding a complicated NSACF selection procedure and reducing switching between multiple functions and signaling transmission caused by UE mobility.

FIG. 3 shows a schematic flowchart of a method for NSACF selection according to an embodiment of the present disclosure. The method may be performed by SMF, as shown in FIG. 3. The method may include the following steps.

In S301, NSACF selection is performed for a network slice based on a service capability of at least one NSACF.

For details of S301, reference may be made to the description of step S101 in FIG. 1, which will not be described again here.

In this embodiment, the above step S301 may include the following steps.

In S3011, a NSACF having the first service capability and the second service capability is selected for the network slice.

For details of S3011, reference may be made to the description of step S2011 in FIG. 2, which will not be described again here.

In S3012, when multiple NSACFs have the first service capability and the second service capability, a NSACF with a high priority is selected from the multiple NSACFs.

There may be multiple NSACFs in the deployed NSACFs that have both the first service capability and the second service capability, and multiple NSACFs that have both the first service capability and the second service capability may have different priorities. For example, based on factors such as deployment locations of the NSACFs, the multiple NSACFs may have different priorities.

In this embodiment, when the SMF selects multiple NSACFs with the first service capability and the second service capability, the SMF can select a NSACF with a high priority from the multiple NSACFs.

According to the method for NSACF selection in this embodiment, the SMF preferentially selects a high-priority NSACF from NSACFs having service capabilities that support monitoring and controlling the number of registered UEs for the network slice and monitoring and controlling the number of established PDU sessions for the network slice. The method can avoid a complicated NSACF selection procedure and reduce transmission of signaling and select a more appropriate NSACF.

FIG. 4 shows a schematic flowchart of a method for NSACF selection according to an embodiment of the present disclosure. The method may be performed by SMF. As shown in FIG. 4, the method may include the following steps.

In S401, NSACF selection is performed for a network slice based on a service capability of at least one NSACF.

For details of S401, reference may be made to the description of step S101 in FIG. 1, which will not be described again here.

In mobile communication networks, PDU session establishment usually occurs after UE registration. That is to say, when selecting a NSACF for a network slice, it is possible that monitoring and controlling of the number of registered UEs have been started for the network slice. For example, when the UE performs registration, a NSACF has been selected for the network slice to monitor and control the number of registered UEs for the network slice. In this case, when performing PDU session establishment for the network slice, the SMF can consider the possibility of still selecting the NSACF to avoid selecting too many NSACFs for the network slice, which may result in overly complicated network slice admission control.

Therefore, in this embodiment, the SMF can determine whether monitoring and controlling of the number of registered UEs have been started for the network slice for the subsequent NSACF selection procedure.

In this embodiment, the above step S401 may include the following steps.

In S4011, if the network slice supports monitoring and controlling of the number of registered UEs, a NSACF that monitors and controls the number of registered UEs for the network slice and has the second service capability is selected for the network slice.

If monitoring and controlling of the number of registered UEs is started for a network slice, that is, the network slice supports monitoring and controlling the number of registered UEs, the SMF can select a NSACF that currently monitors and controls the number of registered UEs for the network slice and has the service capability that supports monitoring and controlling the number of established PDU sessions for the network slice.

For example, in a case where monitoring and controlling the number of registered UEs is started for a network slice, a NSACF may have been selected for the network slice to monitor and control the number of registered UEs for the network slice. The SMF may consider whether the NSACF that currently monitors and controls the number of registered UEs for the network slice has the service capability to support monitoring and controlling the number of established PDU sessions for the network slice; if the NSACF has the service capability, the SMF still selects the NSACF to support monitoring and controlling the number of established PDU sessions for the network slice.

In some embodiments, when monitoring and controlling the number of registered UEs is started for a network slice, there may already be multiple NSACFs monitoring and controlling the number of registered UEs for the network slice. In this case, the SMF can select, from the multiple NSACFs, a NSACF that has a service capability that supports monitoring and controlling the number of established PDU sessions for the network slice, so as to support monitoring and controlling the number of established PDU sessions for the network slice. In some embodiments, if there are multiple NSACFs that currently monitor and control the number of registered UEs for the network slice and have the service capability to support monitoring and controlling the number of established PDU sessions for the network slice, the SMF can further select from the multiple NSACFs a high-priority NSACF to support monitoring and controlling the number of established PDU sessions for the network slice.

According to the method for NSACF selection in the embodiments, the SMF determines whether monitoring and controlling of the number of registered UEs for the network slice is started; if started, the SMF preferentially selects, from the NSACF(s) that monitor and control the number of registered UEs for the network slice, a NSACF that has a service capability that supports monitoring and controlling the number of established PDU sessions for the network slice, which can avoid overly complicated network slice admission control.

FIG. 5 shows a schematic flowchart of a method for NSACF selection according to an embodiment of the present disclosure. The method may be performed by SMF. As shown in FIG. 5, the method may include the following steps.

In S501, NSACF selection is performed for a network slice based on a service capability of at least one NSACF.

For details of S501, reference may be made to the description of step S101 in FIG. 1, which will not be described again here.

In this embodiment, when there is an operator service capability policy, the above step S501 may include the following steps.

In S5011, a NSACF is selected according to the operator service capability policy.

The operator service capability policy includes at least one of the following: indicating to select a NSACF with a required service capability, wherein the required service capability includes the first service capability only or includes the first service capability and the second service capability; and indicating to select a NSACF with a high priority.

In this embodiment, when there is an operator service capability policy, the SMF preferentially selects the NSACF for the network slice based on the operator service capability policy, so that the selected NSACF can satisfy the operator service capability policy.

When the operator service capability policy includes indicating to select a NSACF having a second service capability, it indicates that the operator service capability policy expects to select a NSACF with a service capability that supports only monitoring and controlling the number of established PDU sessions for the network slice. Thus, based on this operator service capability policy, SMF selects a NSACF for the network slice that has the service capability to monitor and control the number of established PDU sessions of the network slice.

When the operator service capability policy includes indicating to select a NSACF having the second service capability and indicating to select a high-priority NSACF, it indicates that the operator service capability policy expects to select a NSACF with a service capability that supports only monitoring and controlling the number of established PDU sessions for the network slice and with a high priority. Thus, based on the operator service capability policy, SMF selects NSACF(s) for the network slice with the service capability of monitoring and controlling the number of established PDU sessions for the network slice, and selects a NSACF with a high priority from the selected NSACF(s).

When the operator service capability policy includes indicating to select a NSACF having the first service capability and the second service capability, it indicates that the operator service capability policy expects to select a NSACF having service capabilities that support monitoring and controlling the number of registered UEs for the network slice and support monitoring and controlling the number of established PDU sessions for the network slice. Therefore, based on the operator service capability policy, the SMF selects for the network slice a NSACF that has the service capabilities that support monitoring and controlling the number of registered UEs for the network slice and support monitoring and controlling the number of established PDU sessions for the network slice.

When the operator service capability policy includes indicating to select a NSACF having the first service capability and the second service capability and indicating to select a high-priority NSACF, it indicates that the operator service capability policy expects to select a high-priority NSACF that has the service capabilities that support monitoring and controlling the number of registered UEs for the network slice and support monitoring and controlling the number of established PDU sessions for the network slice. Therefore, based on the operator service capability policy, the SMF selects for the network slice NSACF(s) that has (have) the service capabilities that support monitoring and controlling the number of registered UEs for the network slice and support monitoring and controlling the number of established PDU sessions for the network slice, and selects a NSACF with a high priority from the selected NSACF(s).

In some embodiments, the operator service capability policy is pre-configured in at least one of SMF and NRF.

The operator service capability policy is pre-configured in the SMF, or may be pre-configured in the NRF. When the operator service capability policy is pre-configured in the NRF, the SMF may obtain the operator service capability policy by accessing the NRF.

According to the method for NSACF selection in the embodiments, if there is an operator service capability policy, the SMF preferentially selects an NSACF according to the operator service capability policy, so that the selected NSACF can meet the operator service capability policy.

Figure 6:
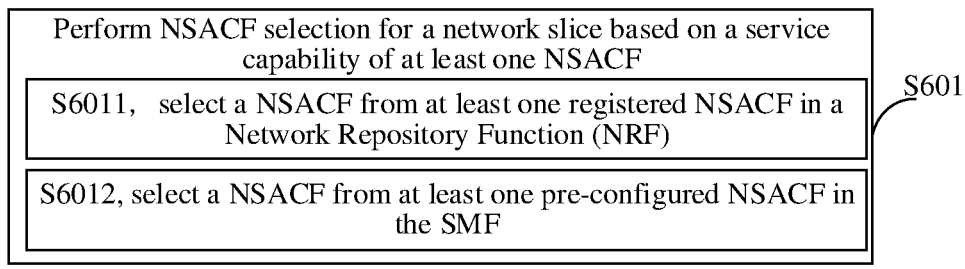
FIG. 6 is a schematic flowchart of a method for NSACF selection according to an embodiment of the present disclosure.

FIG. 6 shows a schematic flowchart of a method for NSACF selection according to an embodiment of the present disclosure. The method may be performed by SME As shown in FIG. 6, the method may include the following steps.

In S601, NSACF selection is performed for a network slice based on a service capability of at least one NSACF.

For details of S601, please refer to description of step S101 in FIG. 1, steps S201 and S2011 in FIG. 2, steps S301 and S3011 to S3012 in FIG. 3, steps S401 and S4011 in FIG. 4, and steps S501 and S5011 in FIG. 5, which will not be described again here.

In this embodiment, the above step S601 may include any of the following steps.

In S6011, a NSACF is selected from at least one registered NSACF in Network Repository Function (NRF). Configuration information of the at least one registered NSACF is stored in the NRF. The configuration information includes Network Slice Selection Assistance Information (S-NSSAIs) and information indicating a service capabilities of the at least one registered NSACF.

At least one NSACF may be registered in NRF, the NSACF provides its configuration information to NRF, and NRF marks the NSACF as available. During the NSACF registration procedure, a NSACF provides S-NSSAIs and a service capability of the NSACF. That is, the configuration information of NSACF registered in the NRF may include S-NSSAIs and capability information indicating its service capabilities. SMF can utilize NRF to perform NSACF discovery and selection.

S-NSSAIs may include multiple S-NSSAIs. S-NSSAI identifies a network slice, which is assistance information used by the network to select a specific network slice instance. S-NSSAI can include the following information: Slice/Service Type (SST), which indicates network slices with different functions and services; Slice Differentiator, which is optional information used to further differentiate network slice instances among all network slice instances that conform to a SST type to supplement the SST.

In some embodiments, the SMF preferentially selects a NSACF with the first service capability and the second service capability from registered NSACF(s) in the NRF.

For specific details on how the SMF selects the NSACF with the first service capability and the second service capability, reference may be made to the relevant descriptions of step S2011 in FIG. 2 and steps S3011 to S3012 in FIG. 3, which will not be described again here.

In some embodiments, the SMF preferentially selects, from registered NSACF(s) in the NRF, a NSACF that monitors and controls the number of registered UEs for the network slice and has the second service capability.

For specific details on how the SMF selects the NSACF that monitors and controls the number of registered UEs for the network slice and has the second service capability, please refer to the relevant description of step S4011 in FIG. 4, which will not be described again here.

In some embodiments, when there is an operator service capability policy, the SMF preferentially selects a NSACF from registered NSACF(s) in the NRF based on the operator service capability policy.

For specific details on how the SMF selects the NSACF based on the operator service capability policy, please refer to the relevant description of step S5011 in FIG. 5, which will not be described again here.

In S6012, a NSACF is selected from at least one pre-configured NSACF in the SMF, where the SMF stores configuration information of the pre-configured NSACF(s). The configuration information includes S-NSSAIs and information indicating the service capability of the registered NSACF(s).

NSACF(s) can be configured locally in SMF, and the configuration information of NSACF(s) can indicate the service capability of NSACF(s) and S-NSSAIs. SMF can use the configuration information to perform NSACF discovery and selection.

In some embodiments, the SMF preferentially selects a NSACF with the first service capability and the second service capability from pre-configured NSACF(s) in the SMF.

For specific details on how the SMF selects the NSACF with the first service capability and the second service capability, reference may be made to the relevant descriptions of step S2011 in FIG. 2 and steps S3011 to S3012 in FIG. 3, which will not be described again here.

In some embodiments, the SMF preferentially selects, from the pre-configured NSACF(s) in the SMF, a NSACF that monitors and controls the number of registered UEs for the network slice and has the second service capability.

For specific details on how the SMF selects the NSACF that monitors and controls the number of registered UEs for the network slice and has the second service capability, please refer to the relevant description of step S4011 in FIG. 4, which will not be described again here.

In some embodiments, when there is an operator service capability policy, the SMF preferentially selects a NSACF from the pre-configured NSACF(s) in SMF based on the operator service capability policy.

For specific details on how the SMF selects the NSACF based on the operator service capability policy, please refer to the relevant description of step S5011 in FIG. 5, which will not be described again here.

According to the method for NSACF selection in the embodiments, the SMF can preferentially select a corresponding NSACF from the NRF or from local, thereby meeting the operator service capability policy, avoiding a complicated NSACF selection procedure and reducing signaling transmission.

Figure 7:
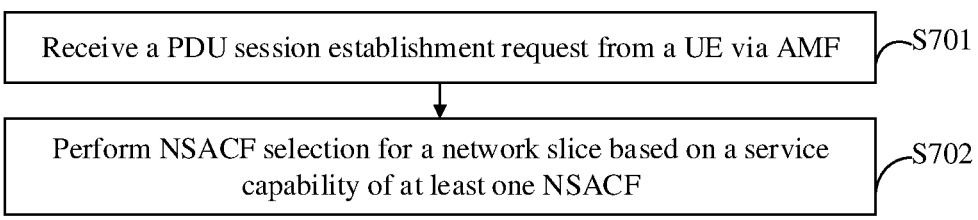
FIG. 7 is a schematic flowchart of a method for NSACF selection according to an embodiment of the present disclosure.

FIG. 7 shows a schematic flowchart of a method for NSACF selection according to an embodiment of the present disclosure. The method may be performed by SME As shown in FIG. 7, the method may include the following steps.

In S701, a PDU session establishment request is received from a UE via AMF, where the PDU session establishment request carries NSSAI.

In S702, NSACF selection is performed for a network slice based on a service capability of at least one NSACF.

When the UE requests to establish a PDU session, the UE may send a PDU session establishment request to the AMF. The AMF sends a PDU session create request message to the SMF in response to the PDU session establishment request. In response to the PDU session create request message, the SMF selects a NSACF for a network slice identified by the S-NSSAI based on the service capability of at least one NSACF.

For details of S702, please refer to description of step S101 in FIG. 1, steps S201 and S2011 in FIG. 2, steps S301 and S3011 to S3012 in FIG. 3, steps S401 and S4011 in FIG. 4, steps S501 and S5011 in FIG. 5, and S601 and S6011 to S6012 in FIG. 6, will not be repeated here.

According to the method for NSACF selection of the embodiment, the SMF may perform NSACF selection in response to the PDU session establishment request.

Figure 8:
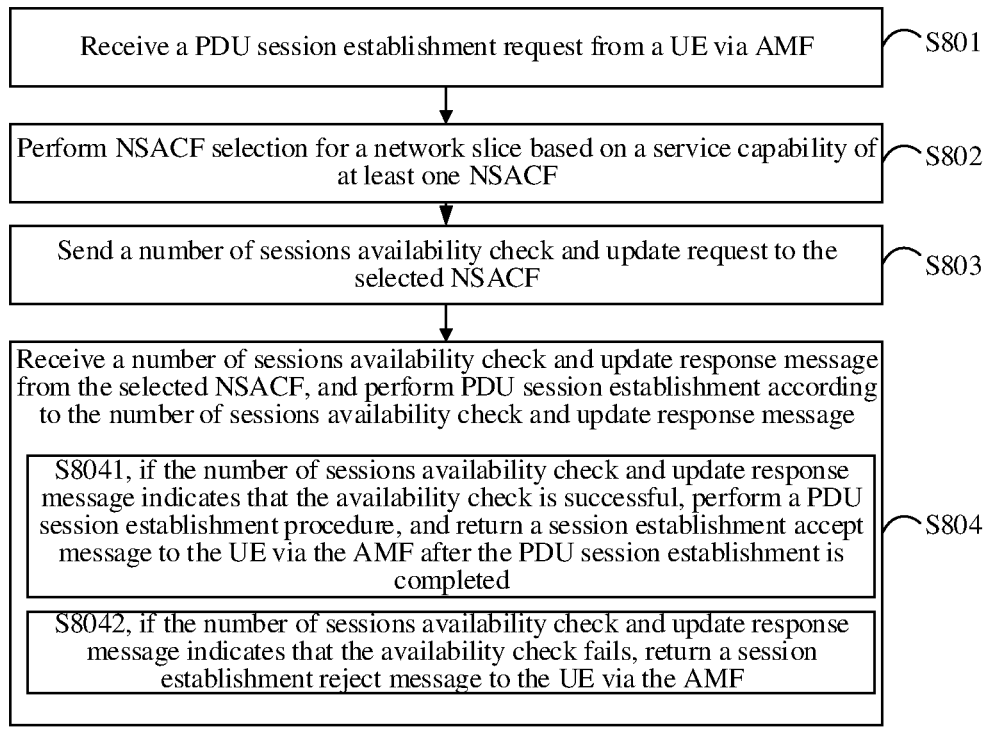
FIG. 8 is a schematic flowchart of a method for NSACF selection according to an embodiment of the present disclosure.

FIG. 8 shows a schematic flowchart of a method for NSACF selection according to an embodiment of the present disclosure. The method may be performed by SMF. As shown in FIG. 8, the method may include the following steps.

In S801, a PDU session establishment request is received from a UE via AMF, where the PDU session establishment request carries S-NSSAIs.

In S802, NSACF selection is performed for a network slice based on a service capability of at least one NSACF.

For details of S802, please refer to description of step S101 in FIG. 1, steps S201 and S2011 in FIG. 2, steps S301 and S3011 to S3012 in FIG. 3, steps S401 and S4011 in FIG. 4, steps S501 and S5011 in FIG. 5, and S601 and S6011 to S6012 in FIG. 6, which will not be repeated here.

In S803, a number of sessions availability check and update request is sent to the selected NSACF. The number of sessions availability check and update request includes S-NSSAIs and an update flag, where the update flag indicates increase of the number of established PDU sessions.

After the SMF selects a NSACF, it can send a number of sessions availability check and update request message to the selected NSACF, so that the NSACF can check the number of established PDU sessions based on the number of sessions availability check and update request message.

In S804, a number of sessions availability check and update response message is received from the selected NSACF, and PDU session establishment is performed based on the number of sessions availability check and update response message.

After the NSACF receives the number of sessions availability check and update request message, the NSACF performs a check on the number of established PDU sessions in response to the request message, and updates the number of established PDU sessions and/or feeds back the number of sessions availability check and update response message according to the check result. After receiving the number of sessions availability check and update response message, the SMF can perform PDU session establishment based on the response message.

In some embodiments, the above step S804 may include the following steps.

In S8041, if the number of sessions availability check and update response message indicates that the availability check is successful, a PDU session establishment procedure is performed, and a session establishment accept message is returned to the UE via the AMF after the PDU session establishment is completed.

If the number of sessions availability check and update response message indicates that the availability check is successful, it indicates that a PDU session can be established with respect to the network slice, and the SMF performs the PDU session establishment procedure based on the number of sessions availability check and update response message and returns a session accept message to the UE via the AMF after the PDU session establishment procedure is completed.

In S8042, if the number of sessions availability check and update response message indicates that the availability check fails, a session establishment reject message is returned to the UE via the AMF.

If the number of sessions availability check and update response message indicates that the availability check fails, it indicates that a PDU session cannot be established for the network slice, for example, because the number of established PDU sessions for the network slice has reached the maximum number, etc., then the SMF returns a session establishment reject message to the UE via the AMF based on the number of sessions availability check and update response message.

According to the method for NSACF selection in the embodiments, after selecting the NSACF, the SMF can use the NSACF to monitor and control the number of established PDU sessions for the corresponding network slice.

Figure 9:
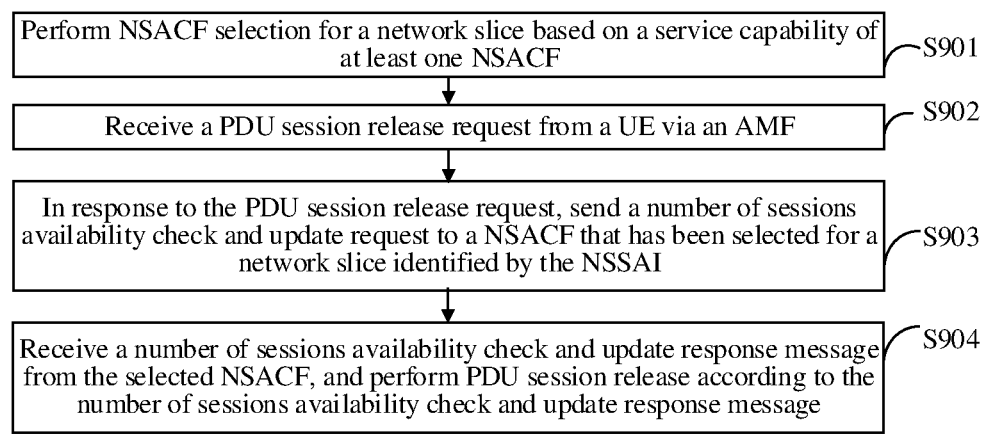
FIG. 9 is a schematic flowchart of a method for NSACF selection according to an embodiment of the present disclosure.

FIG. 9 shows a schematic flowchart of a method for NSACF selection according to an embodiment of the present disclosure. The method may be performed by SME As shown in FIG. 9, the method may include the following steps.

In S901, NSACF selection is performed for a network slice based on a service capability of at least one NSACF.

For details of S901, please refer to description of step S101 in FIG. 1, steps S201 and S2011 in FIG. 2, steps S301 and S3011 to S3012 in FIG. 3, steps S401 and S4011 in FIG. 4, steps of S501 and S5011 in FIG. 5, and S601 and S6011 to S6012 in FIG. 6, which will not be repeated here.

In S902, a PDU session release request is received from a UE via AMF, where the PDU session release request carries S-NSSAIs.

When the UE requests to release a PDU session, the UE may send a PDU session release request to the AMF, and the AMF sends a PDU session release request message to the SMF in response to the PDU session release request.

In S903, in response to the PDU session release request, a number of sessions availability check and update request is sent to the NSACF that has been selected for a network slice identified by the S-NSSAI. The number of sessions availability check and update request includes the NSSAI and an update flag, where the update flag Indicates to reduce the number of established PDU sessions.

In response to the PDU session release request from the UE, the SMF searches for the NSACF that has been selected for the network slice identified by the S-NSSAI included in the PDU session release request, and sends a number of sessions availability check and update request message to the found NSACF, so that the NSACF can perform a check on the number of established PDU sessions based on the number of sessions availability check and update request message.

In S904, a number of sessions availability check and update response message is received from the selected NSACF, and PDU session release is performed according to the number of sessions availability check and update response message.

After the NSACF receives the number of sessions availability check and update request message, the NSACF performs a check on the number of established PDU sessions in response to the request message, and updates the number of established PDU sessions and/or feeds back the number of sessions availability check and update response message according to the check result. After receiving the number of sessions availability check and update response message, the SMF can perform PDU session release based on the response message.

According to the method for NSACF selection in the embodiments, after selecting the NSACF, the SMF can use the NSACF to monitor and control the number of established PDU sessions for the corresponding network slice.

Figure 10:
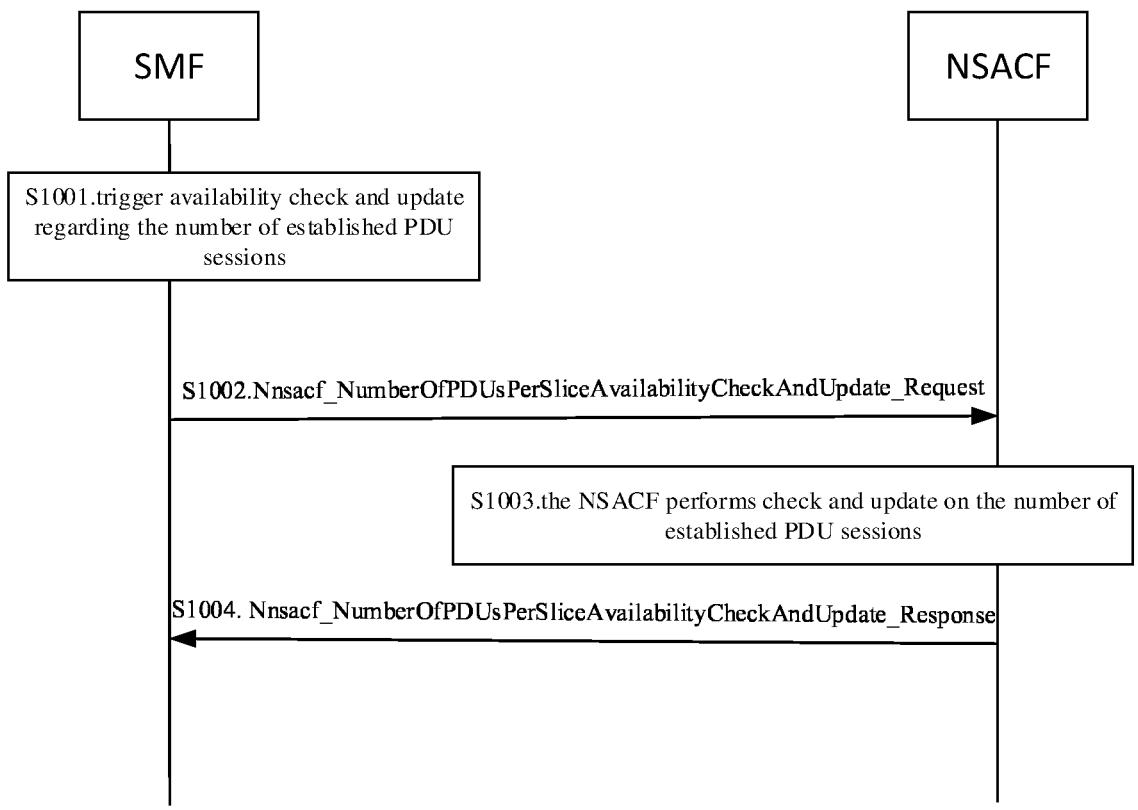
FIG. 10 is an interactive procedure regarding availability check and update of the number of established PDU sessions according to an embodiment of the present disclosure.

FIG. 10 shows an interactive procedure of the number of established PDU sessions availability check and update according to an embodiment of the present disclosure. As shown in FIG. 10, SMF and NSACF interact to implement availability check and update on the number of established PDU sessions. Specifically, it includes the following processes.

In S1001, availability check and update regarding the number of established PDU sessions is triggered.

The availability check and update on the number of established PDU sessions may be triggered in response to a message received by the SMF from other device(s) or may be triggered by the SMF based on some preset triggering mechanism.

For example, the availability check and update on the number of established PDU sessions may be triggered in response to a PDU session establishment request from a UE. In a case of PDU session establishment, the SMF may perform NSACF selection by considering the S-NSSAIs carried in the PDU session establishment request based on the service capability of the NSACF(s). During execution of NSACF selection, if there is an operator service capability policy, SMF preferentially select a NSACF based on the operator service capability policy. If there is no operator service capability policy, the SMF preferentially selects a NSACF with service capabilities that support both monitoring and controlling the number of registered UEs for the network slice and monitoring and controlling the number of established PDU sessions for the network slice. In addition, whether the network slice supports monitoring and controlling the number of registered UEs may also be considered to perform NSACF selection. If there is no operator service capability policy and monitoring and controlling of the number of registered UEs is started for the network slice, the SMF preferentially selects a NSACF that monitors and controls the number of registered UEs for the network slice and has the service capability to support monitoring and controlling the number of established PDU sessions for the network slice. If there is no operator service capability policy and monitoring and controlling of the number of registered UEs is not started for network slicing, the SMF preferentially selects a NSACF having service capabilities that support both monitoring and controlling the number of registered UEs for the network slice and monitoring and controlling the number of established PDU sessions for the network slice.

NSACF(s) can be registered in NRF. A NSACF provides its configuration information to NRF, and NRF marks the NSACF as available. For the PDU session establishment procedure, a NSACF can provide S-NSSAIs and the service capability of the NSACF as input information. If the NSACF is registered in the NRF, the SMF can utilize the NRF to perform NSACF selection.

NSACF(s) can be configured in SMF, and the configuration information of NSACF(s) can indicate the service capability of the NSACF(s) and NSSAI. If NSACF(s) is(are) configured in the SMF, the SMF can use the NSACF configuration information in the SMF to perform NSACF selection.

The operator service capability policy may be, for example, indicating selection of a NSACF with a service capability that supports monitoring and controlling the number of established PDU sessions for the network slice, or supporting selection of a NSACF with service capabilities that support monitoring and controlling the number of established PDU sessions for the network slice and monitoring and controlling the number of registered UEs for the network slice. In addition, the operator service capability policy may also include support selection of a high-priority NSACF.

The operator service capability policy can be pre-configured in SMF and/or NRF.

In another example, the availability check and update on the number of established PDU sessions may be triggered in response to a PDU session release request from the UE.

In yet another example, the availability check and update on the number of established PDU sessions may be triggered in response to a PDU session establishment failure.

In S1002, the SMF sends an availability check and update request message to the selected NSACF.

The availability check and update request (Nnsacf_NumberOfPDUsPerSliceAvailabilityCheckAndUpdate_Request) message includes S-NSSAIs and an update flag. The update flag may indicate to increase the number of established PDU sessions if the availability check and request is triggered at the beginning of the PDU session establishment procedure or indicate to decrease the number of established PDU sessions if the availability check and request is triggered at the end of the PDU session release process.

In S1003, the NSACF performs check and update on the number of established PDU sessions based on the availability check and update request message provided by the SMF.

If the update flag in the availability check and update request message indicates to increase the number of established PDU sessions and the NSACF finds that the number of established PDU sessions for the network slice identified by the S-NSSAI in the availability check and update request message has not yet reached the maximum number, the NSACF increases the number of established PDU sessions.

If the update flag in the availability check and update request message indicates to increase the number of established PDU sessions and the NSACF finds that the number of established PDU sessions for the network slice identified by the S-NSSAI in the availability check and update request message has reached the maximum number, the NSACF does not increase the number of established PDU sessions and returns a result parameter indicating that the number of established PDU sessions for the corresponding network slice has reached the maximum number.

If the update flag in the availability check and update request message indicates to decrease the number of established PDU sessions, the NSACF reduces the number of established PDU sessions for the corresponding network slice.

In S1004, the NSACF feeds back an availability check and update response message to SMF.

When the NSACF finds that the number of established PDU sessions for the corresponding network slice has reached the maximum number, the availability check and update response (Nnsacf_NumberOfPDUsPerSliceAvailabilityCheckAndUpdate_Response) message fed back by the NSACF to the SMF may include the result parameter as described above.

In a case of PDU session establishment, if the NSACF feeds back a result parameter which indicates that the number of established PDU sessions for the network slice has reached the maximum number, the SMF rejects the PDU session establishment request and returns a session establishment reject message to the UE.

In a case of PDU session establishment failure, the SMF may trigger the availability check and update regarding the number of established PDU sessions again, and include in the availability check and update request message an update flag indicating to decrease the number of established PDU sessions so that the number of established PDU sessions is adjusted again in the NSACF.

Figure 11:
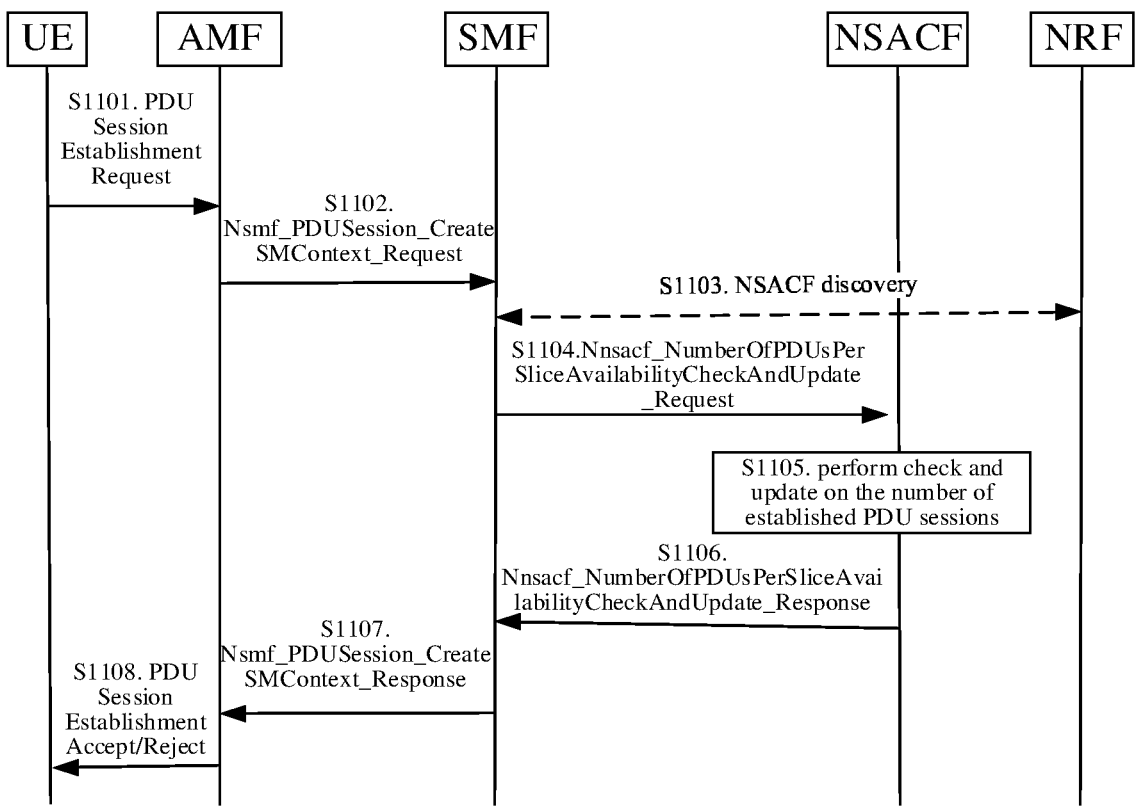
FIG. 11 is an interactive procedure regarding availability check and update of the number of established PDU sessions in a case of PDU session establishment according to an embodiment of the present disclosure.

For example, FIG. 11 shows an interactive procedure regarding NSACF selection and availability check and update regarding the number of PDU sessions established on S-NSSAI in a PDU session establishment situation according to an embodiment of the present disclosure. As shown in FIG. 11, SMF performs NSACF selection and interacts with a NSACF to implement availability check and update on the number of PDU sessions established for this slice. Specifically, it includes the following processes.

In S1101, a UE sends a PDU session establishment request to AMF. The PDU session establishment request carries S-NSSAIs.

In S1102, AMF sends a PDU session create request message (Nsmf_PDUSession_CreateSMContext_Request) to SMF. The PDU session create request message carries S-NSSAIs.

After the SMF receives the PDU session create request message, the SMF may consider the S-NSSAI carried in the PDU session create request message to perform NSACF selection based on service capabilities of NSACF(s). During execution of NSACF selection, if there is an operator service capability policy, SMF preferentially selects a NSACF based on the operator service capability policy. If there is no operator service capability policy, the SMF preferentially selects a NSACF with service capabilities that support both monitoring and controlling the number of registered UEs for the network slice and monitoring and controlling the number of established PDU sessions for the network slice. In addition, whether the network slice supports monitoring and controlling of the number of registered UEs can also be considered to perform NSACF selection. If there is no operator service capability policy and the monitoring and controlling of the number of registered UEs is started for the network slice, the SMF preferentially selects a NSACF that monitors and controls the number of registered UEs for the network slice and has the service capability to support monitoring and controlling the number of established PDU sessions for the network slice. If there is no operator service capability policy and monitoring and controlling of the number of registered UEs is not started for network slice, SMF preferentially selects a NSACF with service capabilities that support both monitoring and controlling the number of registered UEs for the network slice and monitoring and controlling the number of established PDU sessions for the network slice.

NSACF(s) can be registered in NRF. A NSACF provides its configuration information to NRF, and NRF marks the NSACF as available. For the PDU session establishment procedure, a NSACF can provide S-NSSAIs and service capability of the NSACF as input information. If the NSACF is registered in the NRF, the SMF can utilize the NRF to perform NSACF selection.

NSACF(s) can be configured in SMF, and the configuration information of NSACF(s) can indicate the service capability of NSACF(s) and NSSAI. If the NSACF(s) is(are) configured in the SMF, the SMF can use the NSACF configuration information in the SMF to perform NSACF selection.

The operator service capability policy may be, for example, indicating selection of a NSACF with a service capability that supports monitoring and controlling the number of established PDU sessions for the network slice, or supporting selection of a NSACF with service capabilities that support monitoring and controlling the number of established PDU sessions for the network slice and support monitoring and controlling the number of registered UEs for the network slice. In addition, the operator service capability policy may also include supporting selection of a high-priority NSACF.

The operator service capability policy can be pre-configured in SMF and/or NRF.

In S1103, SMF performs NSACF discovery.

If the SMF does not have a NSACF address, the SMF performs enquiry to NRF to obtain the NSACF address. The SMF provides information including S-NSSAI and NF type and so on in order to enquire the NSACF address from the NRF. The NRF obtains the NSACF address that monitors and controls the number of sessions for the slice for the S-NSSAI, and returns the NSACF address to the SMF. If the SMF has a NSACF address, this step can be skipped.

In S1104, SMF sends an availability check and update request message (Nnsacf_NumberOfPDUsPerSliceAvailabilityCheckAndUpdate_Request) to the selected NSACF.

In S1105, the NSACF performs check and update of the number of established PDU sessions.

In S1106, the NSACF feeds back the availability check and update response message (Nnsacf_NumberOfPDUsPerSliceAvailabilityCheckAndUpdate_Response) to SMF.

In S1107, the SMF feeds back a PDU session create response message (Nsmf_PDUSession_CreatSMContext_Response) to AMF.

In S1108, the AMF feeds back a PDU session establishment accept/reject message (PDU Session Establishment Accept/Reject) to the UE.

Figure 12:
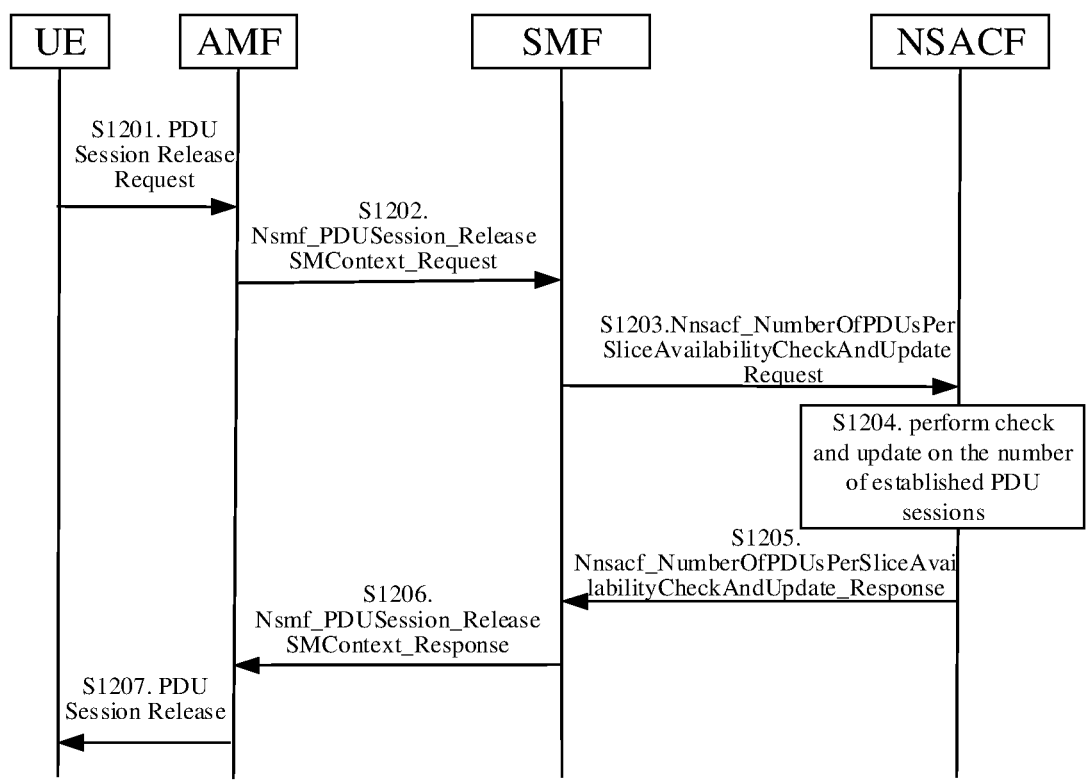
FIG. 12 is an interactive procedure regarding availability check and update of the number of established PDU sessions in a case of PDU session release according to an embodiment of the present disclosure.

As another example, FIG. 12 shows an interactive process of availability check and update of the number of established PDU sessions in a PDU session release situation according to an embodiment of the present disclosure. As shown in FIG. 12, SMF and NSACF interact to implement availability check and update on the number of established PDU sessions. Specifically, it includes the following processes.

In S1201, a UE sends a PDU session release request (PDU Session Release Request) to AMF.

In S1202, the AMF sends a PDU session release request message (Nsmf_PDUSession_ReleaseSMContext_Request) to the SMF.

In S1203, the SMF sends availability check and update request message (Nnsacf_NumberOfPDUsPerSliceAvailabilityCheckAndUpdate_Request) to the selected NSACF.

In S1204, the NSACF performs check and update of the number of established PDU sessions.

In S1205, the NSACF feeds back the availability check and update response message (Nnsacf_NumberOfPDUsPerSliceAvailabilityCheckAndUpdate_Response) to SMF.

In S1206, the SMF feeds back a PDU session release response message (Nsmf_PDUSession_ReleaseSMContext_Response) to AMF.

In S1207, the AMF feeds back a PDU session release message (PDU Session Release) to the UE.

In the above-mentioned embodiments provided by the present disclosure, the methods provided by the embodiments of the present disclosure are introduced from the perspective of the network device. In order to implement each function in the methods provided by the above embodiments of the present disclosure, the network device may include a hardware structure and/or a software module to implement the above functions in the form of a hardware structure, a software module, or a hardware structure plus a software module. One of the above functions can be implemented by a hardware structure, a software module, or a hardware structure plus a software module.

Corresponding to the methods for NSACF selection provided by the above embodiments, the present disclosure also provides an apparatus for NSACF selection. Because the apparatus for NSACF selection provided by the embodiments of the present disclosure corresponds to the methods for NSACF selection provided by the above embodiments, the implementations of the methods for NSACF selection are also applicable to the apparatus for NSACF selection provided in the embodiment, and detailed descriptions will not be provided here.

Figure 13:
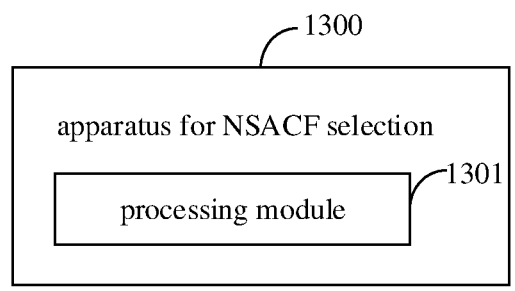
FIG. 13 is a schematic structural diagram of an apparatus for NSACF selection according to an embodiment of the present disclosure.

FIG. 13 is a schematic structural diagram of an apparatus 1300 for NSACF selection according to an embodiment of the present disclosure. As shown in FIG. 13, the apparatus 1300 may includes a processing module 1301.

The processing module 1301 is configured to perform NSACF selection for a network slice based on a service capability of at least one NSACF; wherein the service capability includes at least one of: a first service capability that supports monitoring and controlling a number of registered User Equipments (UEs) for the network slice, and a second service capability that supports monitoring and controlling a number of established Protocol Data Unit (PDU) sessions for the network slice.

In the apparatus for NSACF selection according to the embodiment of the present disclosure, the SMF selects a NSACF for a network slice based on the service capability of at least one NSACF. The service capability includes a first service capability that supports monitoring and controlling the number of registered User Equipments (UEs) for the network slice and/or a second service capability that supports monitoring and controlling the number of established Protocol Data Unit (PDU) sessions for the network slice. In this way, an appropriate NSACF can be selected more accurately and with less signaling.

In some embodiments, the processing module 1301 is configured to: select a NSACF having the first service capability and the second service capability for the network slice.

In some embodiments, the processing module 1301 is configured to: when a plurality of NSACFs have the first service capability and the second service capability, select a NSACF with a high priority from the plurality of NSACFs for the network slice.

In some embodiments, the processing module 1301 is configured to: if the network slice supports monitoring and controlling of the number of registered UEs, select, for the network slice, a NSACF that monitors and controls the number of registered UEs for the network slice and has the second service capability.

In some embodiments, if there is an operator service capability policy, the processing module is configured to: perform NSACF selection for the network slice according to the operator service capability policy; wherein the operator service capability policy includes at least one of: indicating to select a NSACF with a required service capability, wherein the required service capability includes the second service capability only or includes the first service capability and the second service capability; and indicating to select a NSACF with a high priority.

In some embodiments, the processing module 1301 is configured to: select a NSACF for the network slice from at least one registered NSACF in a Network Repository Function (NRF), wherein the NRF stores configuration information of the at least one registered NSACF, and the configuration information includes Network Slice Selection Assistance Information (S-NSSAIs) and information indicating a service capability of the at least one registered NSACF.

In some embodiments, the processing module 1301 is configured to: select a NSACF for the network slice from at least one pre-configured NSACF in the SMF, wherein the SMF stores configuration information of the at least one pre-configured NSACF, and the configuration information includes Network Slice Selection Assistance Information (S-NSSAIs) and information indicating a service capability of the at least one registered NSACF.

In some embodiments, the operator service capability policy is pre-configured in at least one of the SMF and the NRF.

Figure 14:
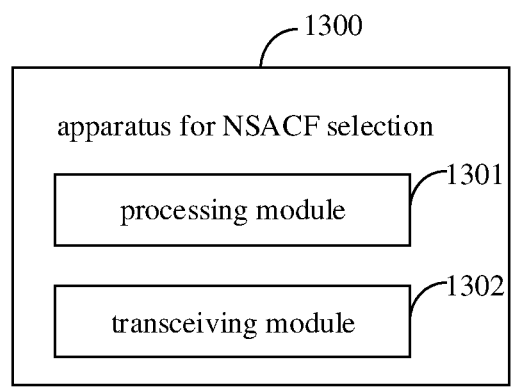
FIG. 14 is a schematic structural diagram of an apparatus for NSACF selection according to an embodiment of the present disclosure.

In some embodiments, as shown in FIG. 14, the apparatus 1300 further includes: a transceiving module 1302 configured to receive a PDU session establishment request from a UE via an Access and Mobility Management Function (AMF), wherein the PDU session establishment request carries S-NSSAIs.

In some embodiments, the transceiving module 1302 is further configured to: send a number of sessions availability check and update request to the selected NSACF, wherein the number of sessions availability check and update request includes the S-NSSAIs and an update flag, and the update flag indicates increase of the number of established PDU sessions; and receive a number of sessions availability check and update response message from the selected NSACF; wherein the processing module 1301 is further configured to perform PDU session establishment according to the number of sessions availability check and update response message.

In some embodiments, the processing module 1301 is configured to: if the number of sessions availability check and update response message indicates that the availability check is successful, perform a PDU session establishment procedure, and indicate the transceiving module 1302 to return a session establishment accept message to the UE via the AMF after the PDU session establishment is completed; and if the number of sessions availability check and update response message indicates that the availability check fails, indicate the transceiving module 1302 to return a session establishment reject message to the UE via the AMF.

In some embodiments, the transceiving module is further configured to: receive a PDU session release request from a UE via an AMF, wherein the PDU session release request carries S-NSSAIs; in response to the PDU session release request, send a number of sessions availability check and update request to a NSACF that has been selected for a network slice identified by the S-NSSAI, wherein the number of sessions availability check and update request includes the NSSAI and an update flag, and the update flag indicates reducing the number of established PDU sessions; and receive a number of sessions availability check and update response message from the selected NSACF; wherein the processing module 1301 is configured to perform PDU session release according to the number of sessions availability check and update response message.

Figure 15:
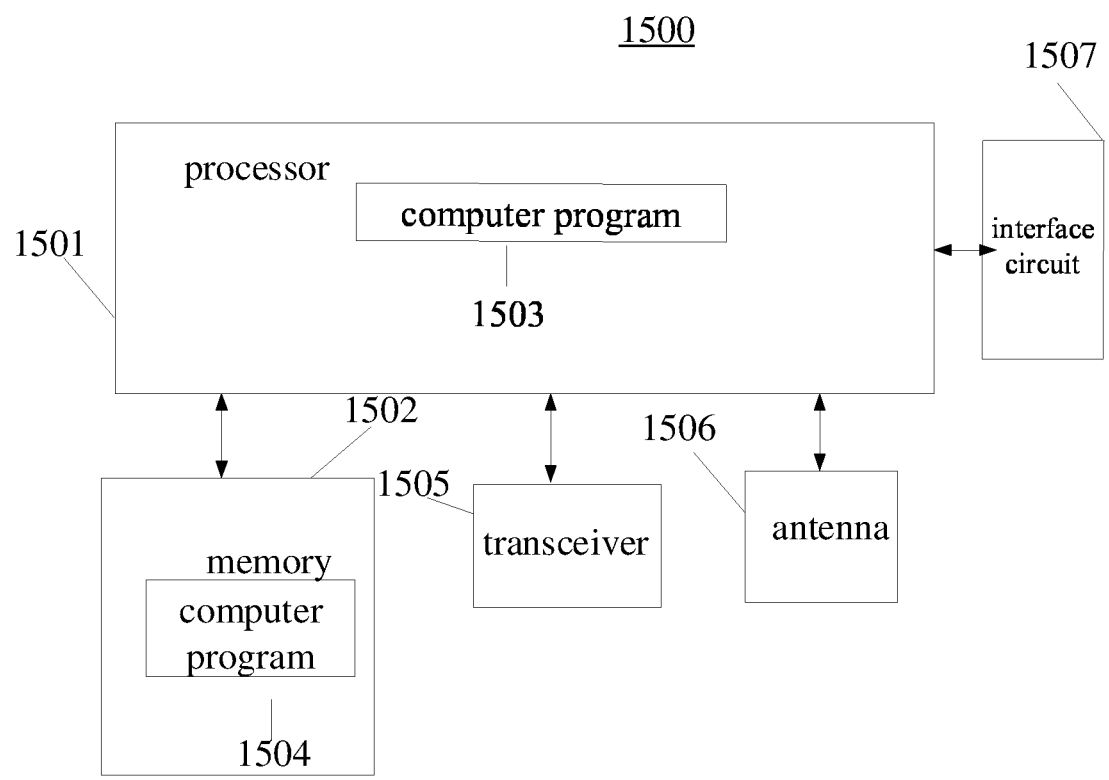
FIG. 15 is a schematic structural diagram of a communication device according to an embodiment of the present disclosure.

FIG. 15 is a schematic structural diagram of a communication apparatus 1500 provided by an embodiment of the present disclosure. The communication apparatus 1500 may be a network device, or may be user equipment, or may be a chip, chip system or processor and so on that supports the network device to implement the above methods, or may be a chip, chip system or processor and so on that supports the terminal device to implement the above methods. The apparatus may be configured to implement the methods described in any of the above method embodiments. For details, please refer to the descriptions in the above method embodiments.

The communication apparatus 1500 may include one or more processors 1501. The processor 1501 may be a general-purpose processor or a special-purpose processor, etc. For example, it can be a baseband processor or a central processor. The baseband processor may be configured to process communication protocols and communication data, and the central processor may be configured to control the communication apparatus (such as base station, baseband chip, terminal device, terminal device chip, DU or CU, etc.), execute a computer program, and processes data for a computer program.

Optionally, the communication apparatus 1500 may further include one or more memories 1502, on which a computer program 1504 may be stored, and the processor 1501 executes the computer program 1504, so that the communication apparatus 1500 performs the methods described in the above method embodiments. Optionally, data may also be stored in the memory 1502. The communication apparatus 1500 and the memory 1502 may be provided separately or integrated together.

Optionally, the communication apparatus 1500 may further include a transceiver 1505 and an antenna 1506. The transceiver 1505 may be called a transceiving unit, a transceiving device, or a transceiving circuit, etc., and is configured to realize transmission and receiving functions. The transceiver 1505 may include a receiver and a transmitter. The receiver may be called a receiving device or a receiving circuit, etc., and is configured to realize the receiving function; the transmitter may be called a transmitting device or a transmitting circuit, etc., and is configured to realize the transmitting function.

Optionally, the communication apparatus 1500 may further include one or more interface circuits 1507. The interface circuits 1507 are configured to receive code instructions and transmit them to the processor 1501. The processor 1501 runs the code instructions to cause the communication apparatus 1500 to perform the methods described in any of the above method embodiments.

When the communication apparatus 1500 is the network device, the processor 1501 is configured to: perform step S101 in FIG. 1, steps S201 and S2011 in FIG. 2, steps S301 and S3011 to S3012 in FIG. 3, steps S401 and S4011 in FIG. 4, steps S501 and S5011 in FIG. 5, steps S601 and S6011 to S6012 in FIG. 6, step S702 in FIG. 7, steps S802 and S804 in FIG. 8, S901 and S904 in FIG. 9; the transceiver 1505 is configured to perform step S701 in FIG. 7, steps S801, S803 to S804 in FIG. 8, and S902 to S904 in FIG. 9.

In an implementation, a transceiver for implementing receiving and transmitting functions may be included in the processor 1501. For example, the transceiver may be a transceiving circuit, or an interface, or an interface circuit. The transceiving circuit, interface or interface circuit configured to implement the receiving and transmitting functions may be separate or integrated together. The above-mentioned transceiving circuit, interface or interface circuit may be configured for reading and writing of codes/data, or the above-mentioned transceiving circuit, interface or interface circuit may be u configured for signal transmission or delivery.

In an implementation, the processor 1501 may store a computer program 1503, and the computer program 1503 runs on the processor 1501, causing the communication apparatus 1500 to perform the methods described in any of the above method embodiments. The computer program 1503 may be solidified in the processor 1501, in which case the processor 1501 may be implemented in hardware.

In an implementation, the communication apparatus 1500 may include a circuit, and the circuit may implement the functions of sending or receiving or communicating in the foregoing method embodiments. The processor and transceiver described in the present disclosure may be implemented in Integrated Circuit (IC), analog IC, Radio Frequency Integrated Circuit (RFIC), mixed signal IC, Application Specific Integrated Circuit (ASIC), Printed Circuit Board (PCB), electronic device, and so on. The processor and transceiver may also be manufactured using various IC process technologies, such as Complementary Metal Oxide Semiconductor (CMOS), nMetal-Oxide-Semiconductor (NMOS), Positive Channel Metal Oxide Semiconductor (PMOS), Bipolar Junction Transistor (BJT), bipolar CMOS (BiCMOS), silicon germanium (SiGe), gallium arsenide (GaAs), etc.

The communication apparatus described in the above embodiments may be a network device, or a terminal device (such as the first terminal device in the above method embodiments), but the scope of the communication apparatus described in the present disclosure is not limited thereto. And, the structure of the communication apparatus is not limited by FIG. 15. The communication apparatus may be a stand-alone device or may be part of a larger device. For example, the communication apparatus may be:
(1) an independent integrated circuit (IC), or a chip, or a chip system or subsystem;
(2) a collection of one or more ICs; optionally, the IC collection may further include a storage component configured to store data and computer programs;
(3) ASIC, such as modem;
(4) a module that can be embedded in other device(s);
(5) a receiver, a terminal device, an intelligent terminal device, a cellular phone, a wireless device, a handheld device, a mobile unit, a vehicle-mounted device, a network device, a cloud device, an artificial intelligence device, etc.;
(6) others, etc.

Figure 16:
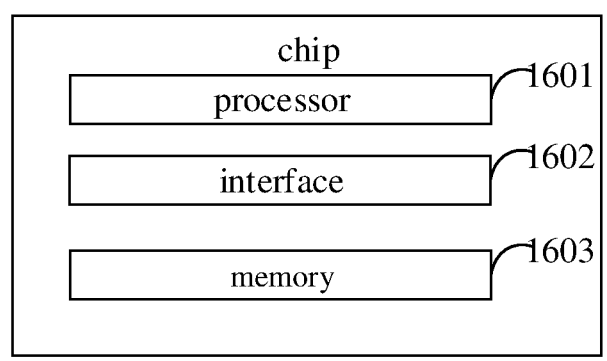
FIG. 16 is a schematic structural diagram of a chip according to an embodiment of the present disclosure.

For a case where the communication apparatus may be a chip or a chip system, reference may be made to the schematic structural diagram of the chip shown in FIG. 16. The chip shown in FIG. 16 includes a processor 1601 and an interface 1602. There may be one or more processors 1601, and there may be multiple interfaces 1602.

For a case where the chip is configured to implement the functions of the network device in the embodiments of the present disclosure, the processor 1601 is configured to perform step S101 in FIG. 1, steps S201 and S2011 in FIG. 2, steps S301 and S3011 to S3012 in FIG. 3, steps S401 and S4011 in FIG. 4, steps S501 and S5011 in FIG. 5, steps S601 and S6011 to S6012 in FIG. 6, step S702 in FIG. 7, steps S802 and S804 in FIG. 8, S901 and S904 in FIG. 9; the interface(s) 1602 is(are) configured to perform step S701 in FIG. 7, steps S801, and S803 to S804 in FIG. 8, and S902 to S904 in FIG. 9.

Optionally, the chip also includes a memory 1603, which is configured to store necessary computer programs and data.

Those skilled in the art can also understand that the various illustrative logical blocks and steps listed in the embodiments of the present disclosure may be implemented by electronic hardware, computer software, or a combination of both. Whether such functionality is implemented in hardware or software depends on the specific application and overall system design requirements. Those skilled in the art can use various methods to implement the described functions for each specific application, but such implementation should not be understood as beyond the scope of protection of the embodiments of the present disclosure.

An embodiment of the present disclosure also provides a system. The system includes the communication apparatus as user equipment in the aforementioned embodiment of FIG. 10 and the communication apparatus as a network device in the aforementioned embodiment of FIG. 11. Alternatively, the system includes the communication apparatus as user equipment and the communication apparatus as a network device in the embodiment of FIG. 16.

The present disclosure also provides a readable storage medium on which instructions are stored, and when the instructions are executed by a computer, the functions of any of the above method embodiments are implemented.

The present disclosure also provides a computer program product, which, when executed by a computer, implements the functions of any of the above method embodiments.

The above embodiments may be implemented in whole or in part by software, hardware, firmware, or any combination thereof. When implemented in software, the embodiments may be implemented in whole or in part in the form of a computer program product. The computer program product includes one or more computer programs. When the computer program is loaded and executed on a computer, processes or functions described in accordance with the embodiments of the present disclosure are generated in whole or in part. The computer may be a general-purpose computer, a special-purpose computer, a computer network, or other programmable device. The computer program may be stored in a computer-readable storage medium, or may be transferred from one computer-readable storage medium to another, for example, the computer program may be transferred from a website, computer, server, or data center to another website, computer, server or data center through wired (such as coaxial cable, optical fiber, DSL (Digital Subscriber Line)) or wireless (such as infrared, wireless, microwave, etc.) means. The computer-readable storage medium may be any available medium that can be accessed by a computer or a data storage device such as a server, data center, etc. that contains one or more available media integrated. The available medium may be magnetic medium (for example, floppy disk, hard disk, magnetic tape), optical medium (for example, high-density DVD (Digital Video Disc)), or semiconductor medium (for example, SSD (Solid State Disk)), etc.

Embodiments of the present disclosure provide a method and apparatus for NSACF selection. The SMF selects a NSACF for a network slice based on the service capability of at least one NSACF. The service capability includes a first service capability that supports monitoring and controlling the number of registered User Equipments (UEs) for the network slice and/or a second service capability that supports monitoring and controlling the number of established Protocol Data Unit (PDU) sessions for the network slice. In this way, an appropriate NSACF can be selected more accurately and with less signaling.

Those of ordinary skill in the art can understand that first, second, and other numerical numbers involved in the present disclosure are only for convenience of description and are not used to limit the scope of the embodiments of the disclosure, nor to indicate a sequential order.

The term "at least one" in the present disclosure can also be described as one or more, and the plurality can be two, three, four or more, and the present disclosure is not limited thereto. In the embodiments of the present disclosure, for a kind of technical features, "first", "second", "third", "A", "B", "C" and "D", etc. are used to distinguish technical features in the kind of technical features, and technical features described associated with "first", "second", "third", "A", "B", "C" and "D" are in no particular sequential order or order of size.

As used herein, the terms "machine-readable medium" and "computer-readable medium" refer to any computer program product, device, and/or apparatus (for example, magnetic disk, optical disk, memory, programmable logic device (PLD)) for providing machine instructions and/or data to a programmable processor, including machine-readable medium that receives machine instructions as machine-readable signals. The term "machine-readable signal" refers to any signal used to provide machine instructions and/or data to a programmable processor.

The systems and techniques described herein may be implemented in a computing system that includes a back-end component (e.g., as a data server), or a computing system that includes a middle component (e.g., an application server), or a computing system that includes a front-end component (e.g., a user computer having a graphical user interface or web browser through which the user can interact with implementations of the systems and technologies described herein), or a computing system including any combination of such back-end component, the middle component, or the front-end component. The components of the system may be interconnected by any form or medium of digital data communication (e.g., a communication network). Examples of communication networks include: local area network (LAN), wide area network (WAN), and the Internet.

A computer system may include a client and a server. The client and server are generally remote from each other and typically interact over a communications network. The relationship of client and server is created by computer programs running on corresponding computers and having a client-server relationship with each other.

It should be understood that various forms of the processes shown above may be used, with steps reordered, added or deleted. For example, steps described in the present disclosure can be executed in parallel, sequentially, or in a different order, as long as the desired results of the technical solutions disclosed in the present disclosure can be achieved, and there is no specific limitation on this.

In addition, it should be understood that the various embodiments described in the present disclosure can be implemented alone or in combination with other embodiments if such combination is allowed.

Those of ordinary skill in the art will appreciate that the units and algorithm steps of each example described in conjunction with the embodiments disclosed herein can be implemented with electronic hardware, or a combination of computer software and electronic hardware. Whether these functions are performed in hardware or software depends on the specific application and design constraints of the technical solutions. Skilled artisans may implement the described functions using different methods for each specific application, but such implementations should not be considered to be beyond the scope of the present disclosure.

Those skilled in the art can clearly understand that for the convenience and simplicity of description, the specific working processes of the systems, devices and units described above can be referred to the corresponding processes in the foregoing method embodiments, and will not be described again here.

The above are only example embodiments of the present disclosure, but the protection scope of the present disclosure is not limited thereto. Any person familiar with the technical field can easily think of changes or substitutions within the technical scope disclosed in the present disclosure, and such changes or substitutions fall within the protection scope of the present disclosure. Therefore, the protection scope of the present disclosure should be determined by the appended claims.

What is claimed is:

1. A method for Network Slice Admission Control Function (NSACF) selection, wherein the method is performed by a Session Management Function (SMF), and comprises:
   receiving, via an Access and Mobility Management Function (AMF), a Protocol Data Unit (PDU) session establishment request from User Equipment (UE); and
   in response to receipt of the PDU session establishment request, selecting a first NSACF for a network slice based on a service capability of at least one NSACF;
   wherein the service capability comprises at least one of:
   a first service capability that supports monitoring and controlling a number of registered UEs for the network slice, or
   a second service capability that supports monitoring and controlling a number of established PDU sessions for the network slice;
   wherein selecting the first NSACF for the network slice comprises at least one of:
   selecting a NSACF having the first service capability and the second service capability for the network slice as the first NSACF;
   when a plurality of NSACFs have the first service capability and the second service capability, selecting a NSACF from the plurality of NSACFs for the network slice according to priorities of the plurality of NSACFs, as the first NSACF;
   in response to that the network slice supports monitoring and controlling of the number of registered UEs, selecting, for the network slice, a NSACF that monitors and controls the number of registered UEs for the network slice and has the second service capability, as the first NSACF; or
   selecting the first NSACF for the network slice according to an operator service capability policy, wherein the operator service capability policy comprises at least one of:
   indicating to select a NSACF with a required service capability, wherein the required service capability comprises the second service capability only or comprises the first service capability and the second service capability; or
   indicating to select a NSACF meeting a priority requirement.

2. The method according to claim 1, wherein selecting the first NSACF for the network slice further comprises:
   selecting the first NSACF for the network slice from at least one registered NSACF in a Network Repository Function (NRF), wherein the NRF stores configuration information of the at least one registered NSACF, and the configuration information comprises Single-Network Slice Selection Assistance Information (S-NSSAI) and information indicating a service capability of the at least one registered NSACF.

3. The method according to claim 1, wherein selecting the first NSACF for the network slice further comprises:
   selecting the first NSACF for the network slice from at least one pre-configured NSACF in the SMF, wherein the SMF stores configuration information of the at least one pre-configured NSACF, and the configuration information comprises Single-Network Slice Selection Assistance Information (S-NSSAI) and information indicating a service capability of the at least one pre-configured NSACF.

4. The method according to claim 1, wherein the operator service capability policy is pre-configured in at least one of the SMF or a Network Repository Function (NRF).

5. The method according to claim 1, wherein the PDU session establishment request carries Single-Network Slice Selection Assistance Information (S-NSSAI).

6. The method according to claim 5, wherein after selecting the first NSACF for the network slice, the method further comprises:
   sending a number of sessions availability check and update request to the selected first NSACF, wherein the number of sessions availability check and update request comprises the S-NSSAI and an update flag, and the update flag indicates increase of the number of established PDU sessions; and
   receiving a number of sessions availability check and update response message from the selected NSACF, and performing PDU session establishment according to the number of sessions availability check and update response message.

7. The method according to claim 6, wherein performing PDU session establishment according to the number of sessions availability check and update response message comprises:
in response to that the number of sessions availability check and update response message indicates that the availability check is successful, performing a PDU session establishment procedure, and returning a session establishment accept message to the UE via the AMF after the PDU session establishment is completed; and
in response to that the number of sessions availability check and update response message indicates that the availability check fails, returning a session establishment reject message to the UE via the AMF.

8. The method according to claim 1, further comprising:
receiving a PDU session release request from the UE via the AMF, wherein the PDU session release request carries a Single-Network Slice Selection Assistance Information (S-NSSAI);
in response to the PDU session release request, sending a number of sessions availability check and update request to a NSACF that has been selected for a network slice identified by the S-NSSAI, wherein the number of sessions availability check and update request comprises the S-NSSAI and an update flag, and the update flag indicates reducing the number of established PDU sessions; and
receiving a number of sessions availability check and update response message from the selected first NSACF, and performing PDU session release according to the number of sessions availability check and update response message.

9. The method according to claim 1, wherein in response to that the network slice supports monitoring and controlling of the number of registered UEs, selecting, for the network slice, the NSACF that monitors and controls the number of registered UEs for the network slice and has the second service capability as the first NSACF, comprises:
when there has been at least one second NSACF which monitors and controls the number of registered UEs for the network slice in UE registration, selecting, from the at least one second NSACF, a NSACF having the second service capability as the first NSACF.

10. An apparatus for Network Slice Admission Control Function (NSACF) selection, wherein the apparatus is applied in a Session Management Function (SMF), and comprises:
a processor; and
a memory storing an instruction executable by the processor;
wherein the processor is configured to:
receive, via an Access and Mobility Management Function (AMF), a Protocol Data Unit (PDU) session establishment request from User Equipment (UE); and
in response to receipt of the PDU session establishment request, select a first NSACF for a network slice based on a service capability of at least one NSACF;
wherein the service capability comprises at least one of:
a first service capability that supports monitoring and controlling a number of registered UEs for the network slice, or
a second service capability that supports monitoring and controlling a number of established PDU sessions for the network slice;
wherein the processor is further configured to perform at least one of:

selecting a NSACF having the first service capability and the second service capability for the network slice, as the first NSACF;
when a plurality of NSACFs have the first service capability and the second service capability, selecting a NSACF from the plurality of NSACFs for the network slice according to priorities of the plurality of NSACFs, as the first NSACF;
in response to that the network slice supports monitoring and controlling of the number of registered UEs, selecting, for the network slice, a NSACF that monitors and controls the number of registered UEs for the network slice and has the second service capability, as the first NSACF; or
selecting the first NSACF for the network slice according to an operator service capability policy, wherein the operator service capability policy comprises at least one of:
indicating to select a NSACF with a required service capability, wherein the required service capability comprises the second service capability only or comprises the first service capability and the second service capability; or
indicating to select a NSACF meeting a priority requirement.

11. The apparatus according to claim 10, wherein the processor is further configured to:
select the first NSACF for the network slice from at least one registered NSACF in a Network Repository Function (NRF), wherein the NRF stores configuration information of the at least one registered NSACF, and the configuration information comprises Single-Network Slice Selection Assistance Information (S-NSSAI) and information indicating a service capability of the at least one registered NSACF.

12. The apparatus according to claim 10, wherein the processor is further configured to:
select the first NSACF for the network slice from at least one pre-configured NSACF in the SMF, wherein the SMF stores configuration information of the at least one pre-configured NSACF, and the configuration information comprises Single-Network Slice Selection Assistance Information (S-NSSAI) and information indicating a service capability of the at least one pre-configured NSACF.

13. The apparatus according to claim 10, wherein the operator service capability policy is pre-configured in at least one of the SMF or a Network Repository Function (NRF).

14. The apparatus according to claim 10, wherein the PDU session establishment request carries Single-Network Slice Selection Assistance Information (S-NSSAI).

15. The apparatus according to claim 14, wherein the processor is further configured to:
send a number of sessions availability check and update request to the selected first NSACF, wherein the number of sessions availability check and update request comprises the S-NSSAI and an update flag, and the update flag indicates increase of the number of established PDU sessions; and receive a number of sessions availability check and update response message from the selected NSACF; and
perform PDU session establishment according to the number of sessions availability check and update response message.

16. The apparatus according to claim 15, wherein the processor is further configured to:

in response to that the number of sessions availability check and update response message indicates that the availability check is successful, perform a PDU session establishment procedure, and return a session establishment accept message to the UE via the AMF after the PDU session establishment is completed; and in response to that the number of sessions availability check and update response message indicates that the availability check fails, return a session establishment reject message to the UE via the AMF.

17. The apparatus according to claim 10, wherein the processor is further configured to:

receive a PDU session release request from the UE via the AMF, wherein the PDU session release request carries S-NSSAI;

in response to the PDU session release request, send a number of sessions availability check and update request to a NSACF that has been selected for a network slice identified by the S-NSSAI, wherein the number of sessions availability check and update request comprises the S-NSSAI and an update flag, and the update flag indicates reducing the number of established PDU sessions;

receive a number of sessions availability check and update response message from the selected NSACF; and perform PDU session release according to the number of sessions availability check and update response message.

18. A non-transitory computer-readable storage medium having stored thereon instructions that, when executed by a processor, cause the processor to:

receive, via an Access and Mobility Management Function (AMF), a Protocol Data Unit (PDU) session establishment request from User Equipment (UE);

in response to receipt of the PDU session establishment request, select a first Network Slice Admission Control Function (NSACF) for a network slice based on a service capability of at least one NSACF;

wherein the service capability comprises at least one of:

a first service capability that supports monitoring and controlling a number of registered UEs for the network slice, or a second service capability that supports monitoring and controlling a number of established PDU sessions for the network slice;

wherein selecting the first NSACF for the network slice comprises at least one of:

selecting a NSACF having the first service capability and the second service capability for the network slice as the first NSACF;

when a plurality of NSACFs have the first service capability and the second service capability, selecting a NSACF from the plurality of NSACFs for the network slice according to priorities of the plurality of NSACFs, as the first NSACF;

in response to that the network slice supports monitoring and controlling of the number of registered UEs, selecting, for the network slice, a NSACF that monitors and controls the number of registered UEs for the network slice and has the second service capability, as the first NSACF; or selecting the first NSACF for the network slice according to an operator service capability policy, wherein the operator service capability policy comprises at least one of:

indicating to select a NSACF with a required service capability, wherein the required service capability comprises the second service capability only or comprises the first service capability and the second service capability; or indicating to select a NSACF meeting a priority requirement.

\* \* \* \* \*